United States Patent

[11] 3,624,803

[72] Inventors Austin U. Bryant
  Walnut Creek;
  Jack E. Piccardo, Oakland, both of Calif.
[21] Appl. No. 3,735
[22] Filed Jan. 19, 1970
[45] Patented Nov. 30, 1971
[73] Assignee Grove Valve and Regulator Company
  Oakland, Calif.

[54] BOLTED VALVE BODY CONSTRUCTION
  3 Claims, 6 Drawing Figs.
[52] U.S. Cl. .................................................... 251/367
[51] Int. Cl. ...................................................... F16k 27/00
[50] Field of Search ........................................... 251/315,
  309, 316, 317, 367; 137/454.5, 454.6

[56] References Cited
  UNITED STATES PATENTS
2,032,623  3/1936  Lewis ............................ 251/309
3,269,692  8/1966  Shafer ........................... 251/315 X
3,339,887  9/1962  Hutchens ....................... 251/315 X
3,416,558  12/1968 Works ........................... 251/315 X
3,456,916  7/1969  Ytzen et al. .................... 251/309
3,460,802  8/1969  Colby et al. .................... 251/315 X
3,480,253  11/1969 Prese et al. .................... 251/315 X
3,497,178  2/1970  Priese ............................ 251/315 X FOREIGN PATENTS
711,636  7/1954  Great Britain ................. 251/315

Primary Examiner—Samuel Scott
Attorney—Melvin R. Stidham

ABSTRACT: A valve body construction comprising a tubular body member with a closure received in one end thereof against an internal shoulder or other inward abutment. A thrust ring is also received in the one end of the body member outward of the closure with retainer means locking the thrust ring against outward movement to hold the closure in place. In a preferred embodiment, the retainer means comprises a ring received in the end of the body with a plurality of shear screws threaded into tapped holes around the juncture between the ring and end of the tubular body member.

INVENTORS
JACK E. PICCARDO
AUSTIN U. BRYANT
BY
Melvin R. Stidham
ATTORNEY

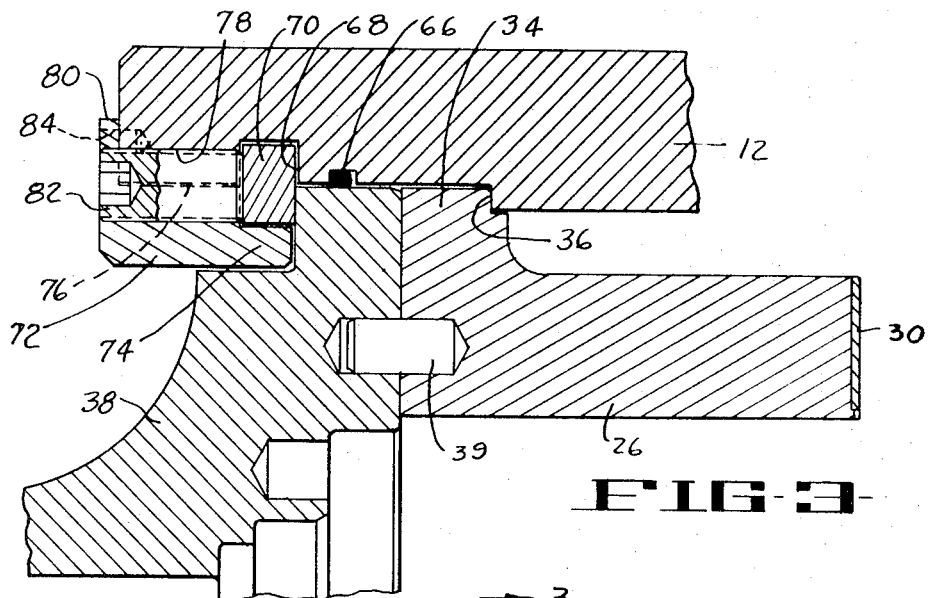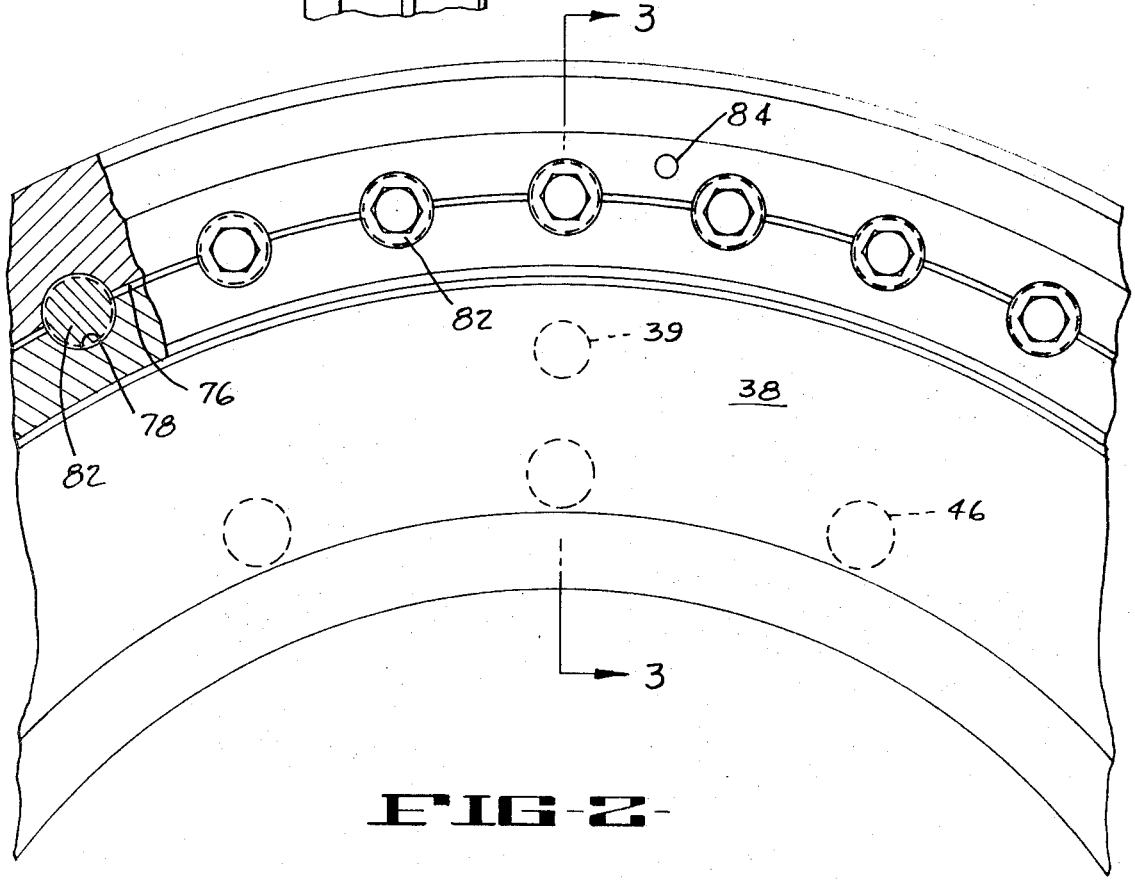

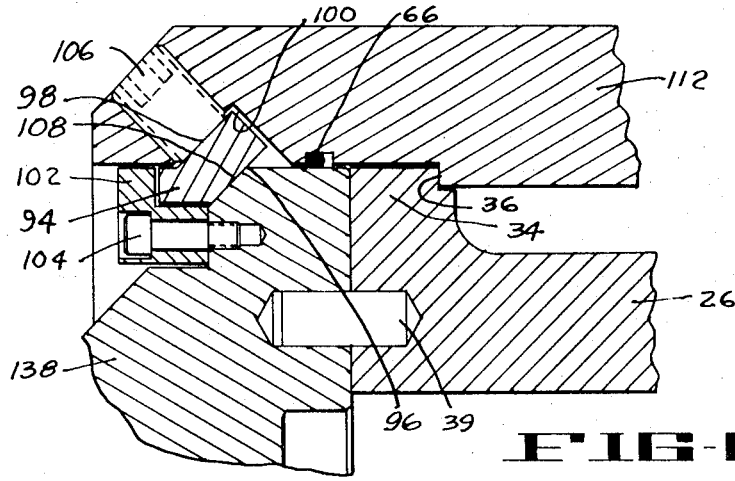
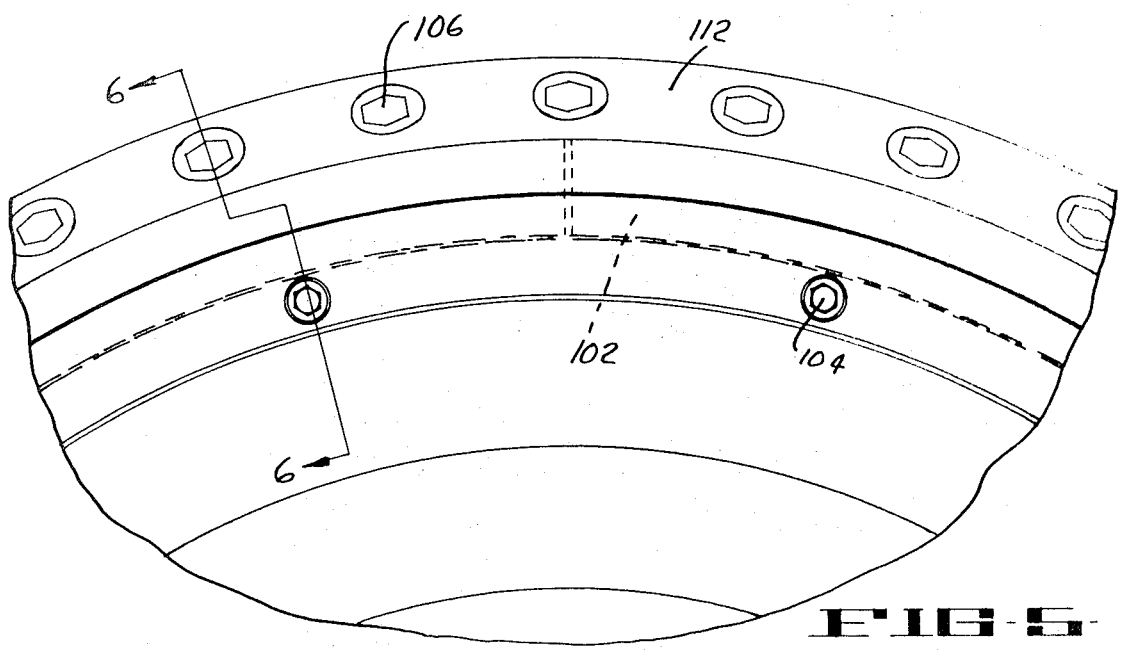
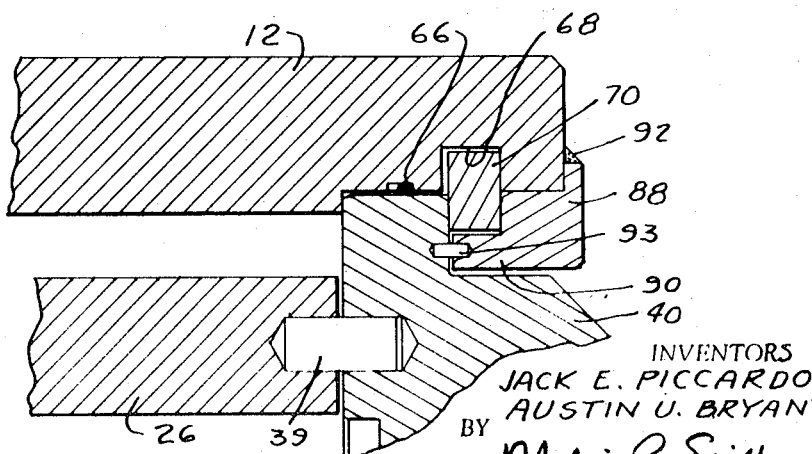

BOLTED VALVE BODY CONSTRUCTION

BACKGROUND OF THE INVENTION

This invention relates to a valve body construction and, more particularly, to a valve body of bolted construction.

In some structures, such as gate or ball valves, it has been deemed advantageous to bolt, rather than weld, at least one of the end closures with flow passages to the main body member. This, of course, provides greater access for repair of replacement of internal components. Conventionally, the end closures are held in place by bolts extending through openings therein and threaded into an end face of the body or housing. This, of course, requires that the bolts be located outward of the inner surface of the body and, therefore, results in a substantial bending moment across the closure under internal pressures. In addition, particularly for high-pressure valves, the bolts have to be of sufficient size and number to withstand the substantial tensile stresses to which they may be subjected. Such stresses are particularly great during testing when the valve bodies are subjected to two or more times the working pressures for which they are designed. It follows that, as bolt holes are increased in size and number, the body wall thicknesses have to be greatly increased in order to compensate for the tapped holes.

OBJECTS OF THE INVENTION

It is an object of this invention to provide a bolted valve body construction wherein the end closure fit within a tubular body member to minimize the bending moment arm.

It is a further object of the invention to minimize the size of the bolts and reduce the torque required in a bolted valve body construction.

It is a further object of this invention to provide a load-bearing member to take internal test pressures without loading the bolts.

It is a further object of this invention to provide a bolted valve body construction wherein the load on the bolts is in shear distributed over the threads of the bolts.

It is a further object of this invention to provide a valve body construction with minimum wall thicknesses.

It is a further object of this invention to provide a bolted valve end closure wherein the bolting assembly is independent of the end closure.

Other objects and advantages of the invention will become apparent from the detailed description to follow, when read in conjunction with the accompanying drawings.

BRIEF DESCRIPTION OF THE INVENTION

In a preferred embodiment of this invention, the main body member is of cylindrical tubular configuration, and circular end closures with flow passages therethrough are received in the ends. The end closures are held against an internal shoulder or other inward abutment by means of segmented thrust rings which seat in grooves around the body outward of the closures. Retainer rings which hold the segmented thrust rings in place are secured to the valve body. In a preferred embodiment, the retainer ring fits within the valve body tube with a portion extending within the setmented throat ring. A series of holes are bored and tapped around the circular juncture between the end of the body tube and the retainer ring so that the shear screws received in the holes take internal loads in shear distributed over their threads.

BRIEF DESCRIPTION OF THE DRAWINGS

FIG. 2 is a partial end view of the end closure joint;

FIG. 3 is a partial section view of the end closure joint taken along line 3—3 of FIG. 2;

FIG. 4 is a partial section view of another embodiment of the end closure joint;

FIG. 5 is a partial end view of still another embodiment of the end closure joint; and FIG. 6 is a section view taken along line 6—6 of FIG. 5.

DESCRIPTION OF THE PREFERRED EMBODIMENTS

Figure 1:
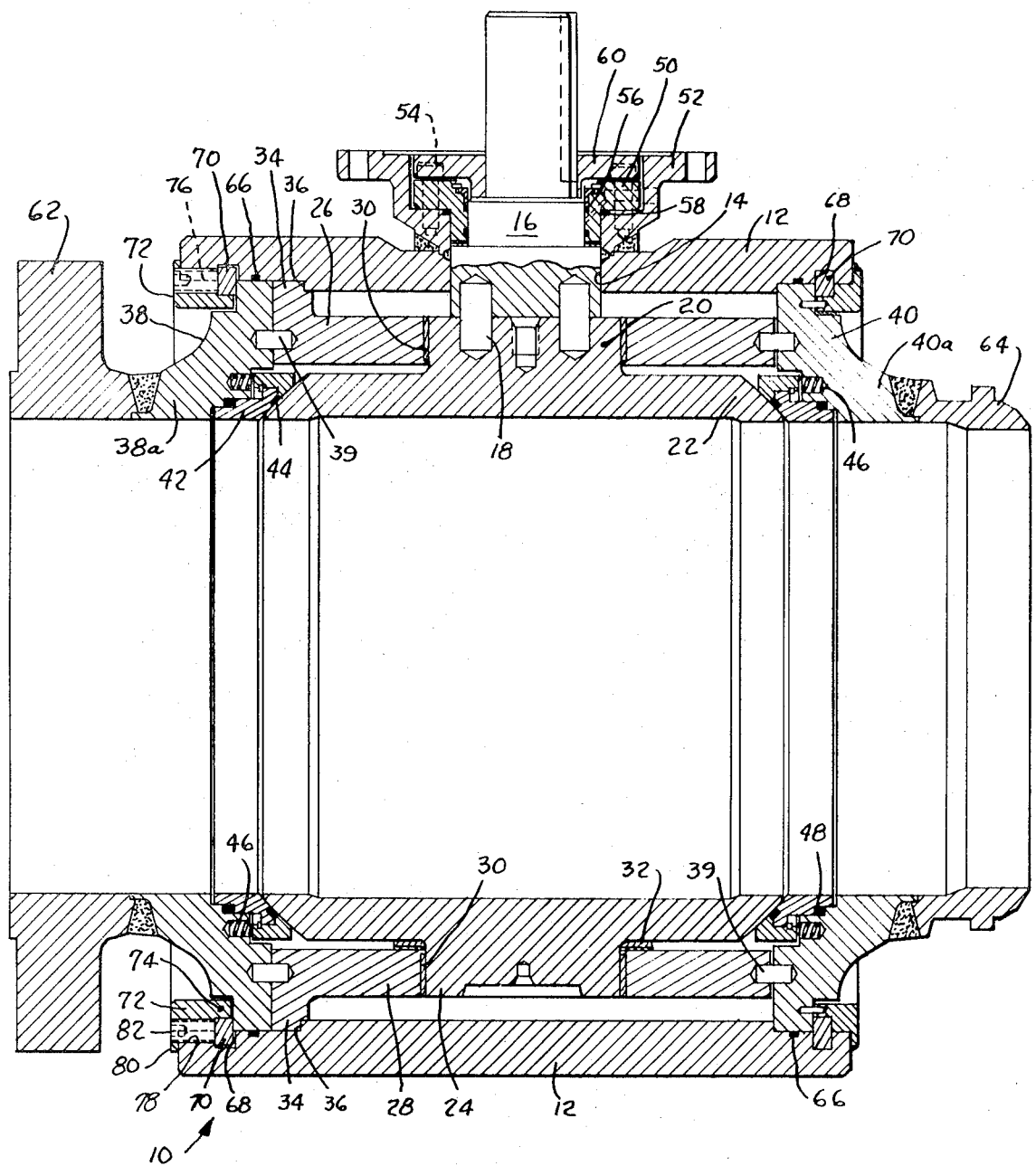
FIG. 1 is a vertical section view of a ball valve embodying features of this invention.

Referring more particularly to FIG. 1, the ball valve 10 of this invention includes a generally cylindrical main body tube 12 which is bored at the top 14 to receive a valve stem 16 which, in turn, is releasably connected as by means of suitable pins 18 to the upper trunnion 20 of a valve ball 22. The upper and lower trunnions 20 and 24 of the ball are rotatably carried in upper and lower bearing blocks 26 and 28, with suitable bushing 30 being provided to facilitate rotation thereof. A thrust bearing 32 is provided on the lower bearing block to carry the weight of the ball. The bearing blocks 26 and 28 are held securely in place by firmly clamping a flange 34 between an internal shoulder 36 in the main body tube 12 and one of the end valve closures 38. Pins 39 define the proper disposition of the bearing blocks 26 and 28. The end closures 38 and 40 are, in turn, firmly secured within the main body tube by means hereinafter to be described in detail. Seat ring assemblies 42 which may contain a suitable resilient seal such as on O-ring 44 are provided to seal on both the upstream and downstream side of the valve ball 22, with initial sealing engagement being provided by a plurality of coil springs 46 biasing them toward the ball. An O-ring 48 is provided around each seat ring assembly to seal between the seat ring and the valve closure 38 or 40.

The structure thus far described lends itself readily to fabrication in that with one end closure 38 removed, the bearing blocks 26 and 28 may be placed on the upper and lower trunnions and the entire assembly inserted into the main body tube 12. Then, the stem is inserted through the top bore 14 and interlocked at 18 with the upper trunnion 20. Then, a gland plate 50 is inserted into an adapter member 52 for an automatic operator (not shown) and secured in place as by means of capscrews 54. The gland plate 50 carries suitable seals such as O-rings 56 to seal around the stem and then a larger O-ring 58 may be provided to seal between the gland plate 50 and adapter plate 52. Two of the capscrews which secure the gland plate in place also function as stops which, in cooperation with a stop plate 60 keyed or otherwise secured to the stem, define the open and closed positions of the valve ball 22. When the body O-ring 66 is placed and the end closure 38 with seat ring assembly 42 included, is inserted into the main body tube and secured in place, the assembly is complete.

The end closures are preferably formed to terminate in a stub pipe duct 38a, 40a which provides an overall valve length less than the standard. Then, a flange end 62 or weld end 64 may be selectively placed and welded to the stubs 38a, 40a to extend the overall length to standard. Hence, the valve may be substantially assembled and then the desired connection members welded in place upon receipt of a customer's order.

Referring now to FIGS. 2 and 3, there is shown a preferred embodiment of the end closure joint. As there shown, a groove may be cut around either the end closure 38 or the body tube 12 to provide a recess for a suitable seal such as the O-ring 66 to seal the end closure joint. The flange 34 on the bearing blocks 26, 28 is clamped between the end closure and the internal shoulder 36 and the body tube end, in turn, functions as an inner abutment for the end closure 38. A groove 68 around the body tube receives a segmented thrust ring 70 which is capable of taking the load on the end closure 38 even under internal pressures at test level.

The thrust ring 70 is held in the groove 68 by means of a retainer ring 72 that has an annular protuberance 74 extending within the segmented thrust ring 70. Around the circular crack or juncture 76 between the retainer ring and the inner surface of the body tube 12 are a plurality of tapped holes 78 which are centered on the junction between the two members. A radial flange 80 on the retainer ring 72 extends over the end face of the body tube and is of a sufficient width to contain the full diameter of the tapped holes 78 so that machining it is not necessary to start a drilled hole in the crack 76 between the two members. Threaded into the tapped holes are a plurality of shear screws 82 which secure the retainer ring 72 firmly within the body tube 12 and provide considerable resistance to internal pressure by distributing the shear stresses over the total area of the interengaged threads.

The segmented thrust ring 70 is of sufficient cross section to withstand considerable interior pressures. Hence, in assembly the segmented ring 70 may be placed and the retainer ring 72 inserted to prevent collapse thereof. Then, when the shear screws 82 are threaded in, they are stopped short of engagement with the segmented ring 70 so that the valve test pressure, which is at least twice the working pressure, may be carried by the segmented thrust ring. After testing, the shear screws 82 are fully threaded to clamp the bearing block flange firmly whereby the working pressures in operation are transferred to the screws.

In order to facilitate reassembly in the event the valve must be disassembled, there are preferably provided opposing locking holes in the retainer ring 72 and end face of the body tube 12 so that a pin 84 may be inserted to lock the ring in desired angular position until the shear screws are replaced. It will be noted that the thrust ring 70, the retainer ring 72 and the shear screws are matched to the body tube 12 and are independent of the end closures. Hence, end closures may readily be exchanged.

Referring now to FIG. 4, an alternate form of retainer ring 88 may be provide on one or both sides of the main body tube 12. In this case, the closure joint is sealed as by means of an O-ring 66 and a segmented thrust ring 70 is inserted into an accommodating internal groove 68 in order to carry the outward thrust from internal pressures. All of the load is carried by the segmented thrust ring 70 and the retainer ring 88 is provided simply to hold the thrust ring 70 in the groove 68 by insertion of an extension 90 thereon into the thrust ring 70, The retainer ring may be releasably secured to the end wall of the body tube as by means of a few widely spaced tack welds 92. All of the load is carried by the thrust ring 70. A pin 93 may be provided to insure proper alignment of the body tube 12, the closure 40 and, hence, the bearing block 26.

In the embodiment of FIGS. 5 and 6, the segmented thrust ring 94 has parallel frustoconical inner and outer surfaces 96 and 98 received in an annular recess 100 having converging frustoconical surfaces. A retainer ring 102 is secured to the end closure 138 as by means of capscrews 104, to hold the thrust ring 94 in place during assembly and testing. Then the thrust ring 94 is firmly engaged by set screws 106, or the like, threaded at an angle with the body tube 112 to force the thrust ring 94 firmly against the sloping face 108 of the end closure 138, thus clamping the flange 34 of the bearing block 26 against the internal shoulder 36. Again, the end closure joint may be sealed by means of an O-ring 66.

While this invention has been described in conjunction with preferred embodiments thereof, it is obvious that modifications and changes therein may be made by those skilled in the art without departing from the spirit and scope of this invention.

What is claimed is:

1. A valve structure comprising;
   a tubular main body member,
   a closure having a flow passageway therethrough received in one end of said main body member,
   means forming an axially inward abutment for said closure,
   a recess around said main body member outward of said closure,
   a segmented thrust ring in said recess,
   a retainer ring received in said one end outward of said thrust ring, and
   a plurality of screws on said main body member bearing against said thrust ring to bias it axially outward against said closure.

2. The valve structure defined by claim 1 wherein:
   said segmented ring has generally parallel frustoconical inner and outer surfaces, and
   said screws are threaded through said main body member normal to the outer surface of said segmented ring.

3. A valve structure comprising:
   a tubular main body member,
   a closure having a flow passageway therethrough received in one end of said main body member,
   means forming an axially inward abutment for said closure,
   a groove around the inside of said main body member outward of said closure,
   a segmented thrust ring received in said groove and extending radially inward therefrom to lock said closure against outward displacement,
   a retainer ring received within said segmented ring to prevent radial displacement thereof, and
   means securing said retainer ring to said main body member.

* * * * *